(12) United States Patent
Sella et al.

(10) Patent No.: US 9,088,509 B1
(45) Date of Patent: Jul. 21, 2015

(54) ADAPTIVE NETWORK FUNCTION CHAINING

(71) Applicant: Level 3 Communications, LLC, Broomfield, CO (US)

(72) Inventors: William Thomas Sella, Parker, CO (US); Harold Wayne Teets, Highlands Ranch, CO (US); James Michael Sella, Parker, CO (US); Pete Joseph Caputo, II, Highlands Ranch, CO (US); Travis Duane Ewert, Highlands Ranch, CO (US)

(73) Assignee: LEVEL 3 COMMUNICATIONS, LLC, Broomfield, CO (US)

( * ) Notice: Subject to any disclaimer, the term of this patent is extended or adjusted under 35 U.S.C. 154(b) by 0 days.

(21) Appl. No.: 14/492,773

(22) Filed: Sep. 22, 2014

(51) Int. Cl.
*H04L 12/851* (2013.01)
*H04L 12/26* (2006.01)
*H04L 12/24* (2006.01)

(52) U.S. Cl.
CPC ........ *H04L 47/2425* (2013.01); *H04L 41/5019* (2013.01); *H04L 43/0894* (2013.01); *H04L 43/16* (2013.01)

(58) Field of Classification Search
CPC ......... H04L 43/12; H04L 45/00; H04L 12/26; H04L 41/0816; H04L 63/1416; H04L 63/20; H04L 43/16; H04L 63/1408
See application file for complete search history.

(56) References Cited

U.S. PATENT DOCUMENTS

| | | | |
|---|---|---|---|
| 7,403,988 B1 * | 7/2008 | Blouin et al. | 709/223 |
| 7,706,291 B2 * | 4/2010 | Luft et al. | 370/246 |
| 7,970,930 B2 * | 6/2011 | Dobbins et al. | 709/238 |
| 2009/0073977 A1 * | 3/2009 | Hussain et al. | 370/389 |
| 2013/0308644 A1 * | 11/2013 | Ferguson et al. | 370/392 |

* cited by examiner

Primary Examiner — Jung Park

(57) ABSTRACT

Disclosed herein are system, method, and computer program product embodiments for dynamically applying network functions to traffic flows based on heuristics, policy conditions and client-specified conditions. A network monitors a network traffic flow to determine whether the network traffic flow meets a first criterion of a first rule. The criterion specifies that when the first criterion is met a network function be used to analyze or process the network traffic flow. When the network traffic flow is determined to meet the first criterion, the network determines a first route through the network to a network function provider that provides the network function and configures one or more routers along the first route to forward the network traffic flow to the network function provider for analysis or processing.

21 Claims, 5 Drawing Sheets

ADAPTIVE NETWORK FUNCTION CHAINING

BACKGROUND

1. Technical Field

Embodiments generally relate to network services.

2. Background

Some modern data networks provide personalized services. Networks may provide connections between clients subject to service level agreements (SLAs) specifying characteristics and performance guarantees. For example, clients may establish a virtual Ethernet connection with a specified dedicated bandwidth.

To these connections, some networks may apply network functions, such as, for example, intrusion detection, firewalls, packet inspection, etc. Providing these functions may require changes to routing of traffic flow to route data to a server that provides the function. For example, an intrusion detection system may inspect sequences of packets to detect and prevent network attacks. Therefore, traffic may be routed through a particular device that provides the intrusion detection function.

Traditional routing algorithms rely on local information at each router regarding its neighboring links and devices to route data. A router maintains such information in a routing table. Based on the destination address of an incoming packet, a router uses its routing table to forward the packet to a specific neighboring device.

A technique, referred to as Software Defined Networks (SDNs), separates the control and forwarding functions into separate devices. A control device may use a global knowledge of the network topology to determine a path through the network of forwarding devices for individual data flows. In this way, the control device may, for example, establish paths that minimize delay or maximize bandwidth through the network, or route a data flow through a particular device that provides a particular network function.

Traditional approaches to providing network functions rely on setting up the function when initiating a network service. For example, a client may establish a virtual Ethernet connection that includes a firewall function at a medium level of security inspection. However, this approach may fail to adequately respond to changing network conditions and may waste resources by processing the network function for the duration of the network service.

SUMMARY

In view of the above, it would be advantageous to provide a mechanism for dynamically providing network functions based on specified conditions.

In an embodiment, a system determines a network and monitors a network traffic flow to determine whether the network traffic flow meets a first criterion of a first rule. The criterion specifies that when the first criterion is met a network function be used analyze or process the network traffic flow. When the network traffic flow is determined to meet the first criterion, the network determines a first route through the network to a network function provider that provides the network function and configures one or more routers along the first route to forward the network traffic flow to the network function provider for analysis or processing.

In an embodiment, a network determines an initiation time for initiating the use of a network function to analyze or process a network traffic flow. The network determines a first route through the network to a network function provider that provides the network function and configures the one or more routers along the first route to forward, at the initiation time, the network traffic flow to the network function provider for analysis or processing.

Method and computer-readable medium embodiments are also disclosed.

Further embodiments and features, as well as the structure and operation of the various embodiments, are described in detail below with reference to accompanying drawings.

BRIEF DESCRIPTION OF THE DRAWINGS

The accompanying drawings are incorporated herein and form a part of the specification.

In the drawings, like reference numbers generally indicate identical or similar elements. Additionally, generally, the leftmost digit(s) of a reference number identifies the drawing in which the reference number first appears.

DETAILED DESCRIPTION

In embodiments, network functions are dynamically applied to traffic flows based on heuristics, policy conditions and client-specified conditions. In an example, a network provides data communications between clients. The network establishes a service that provides communications between clients according to parameters associated with, for example, bandwidth, latency, jitter, etc. The network monitors its traffic, and when a specified condition is met, the network routes the service's traffic, or a portion of the service's traffic, through a processing element that applies a network function. The conditions may be related to any network characteristic, such as those associated with performance, capacity, security, etc. The conditions may be user-defined or set by the network administrators. The network function may also be applied according to a schedule. The network function may be removed after another condition is met or after a specified period of time. Providing network functions in response to conditions and schedules gives clients and administrators improved flexibility in managing the connections and performance and may help reduce overall network resource consumption.

Figure 1A:
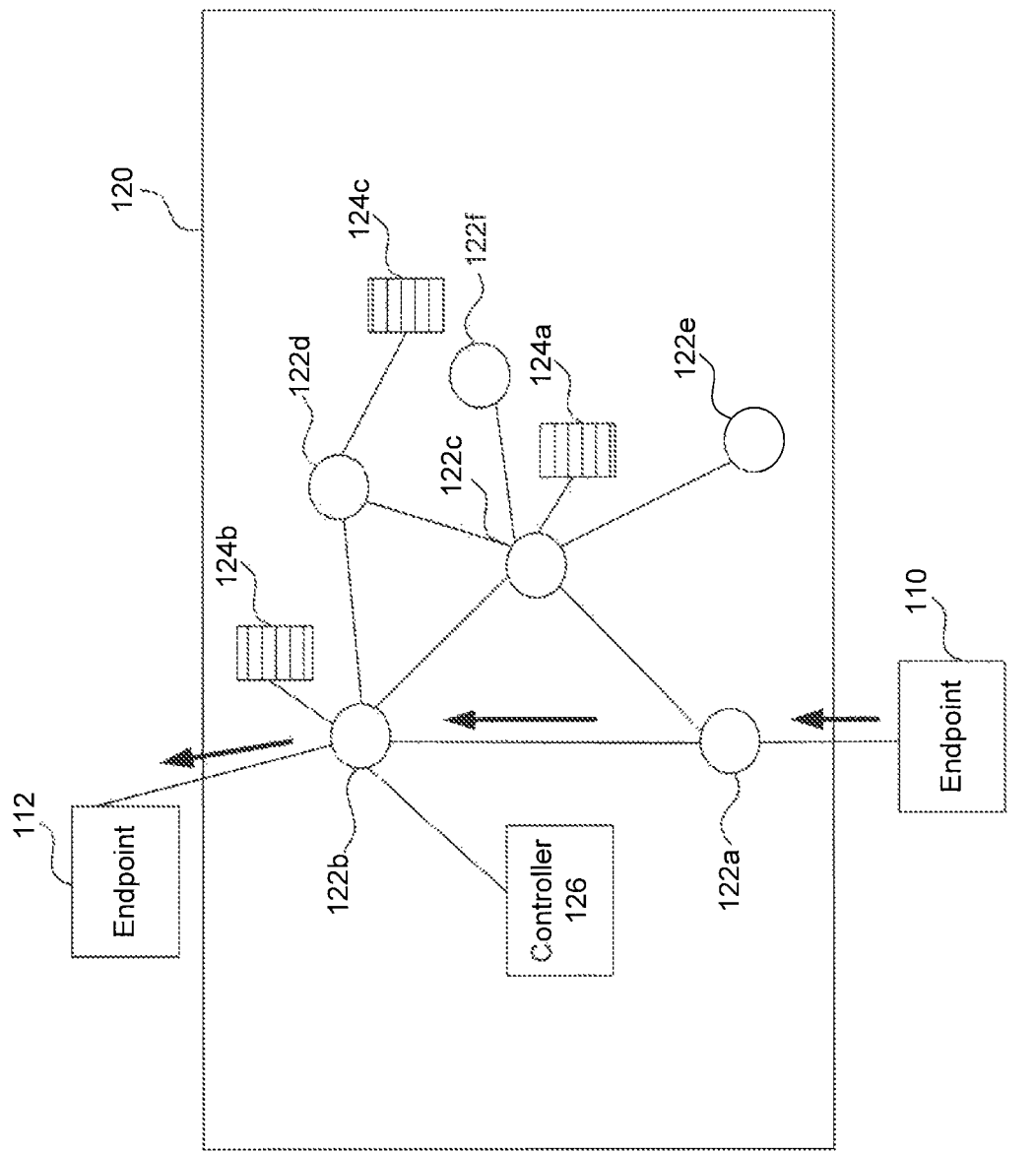
FIGS. 1A-B show diagrams illustrating an network environment for dynamically provisioning network functions, according to an example embodiment.

FIG. 1A shows a diagram illustrating an network environment 100 for dynamically provisioning network functions, according to an example embodiment.

Network environment 100 includes network 120 that provides network communications between multiple endpoints. In an embodiment, network 120 provides configurable data communications services to multiple endpoints for a service fee.

Example endpoints 110 and 112 can be one or more client computing devices that utilize services of network 120. Endpoints 110 and 112 can be, by way of example, local area networks (LANs), computers, mobile devices, servers, clusters, etc. In an example, endpoints 110 and 112 may themselves be networks and may use network 120 as a transit network to communicate with each other.

Network 120 includes a plurality of routers 122*a-f*, one or more data centers 124*a-b*, and one or more controllers 126.

Network 120 can be a network configured to transmit data between client computing devices, such as, for example, personal computers, servers, mobile devices, local area networks (LANs), etc. In an embodiment, network 120 is a wide area network (WAN) or a metropolitan area network (MAN). In an embodiment, network 120 provides virtual networking services, such as, for example, virtual Ethernet connections, virtual local area networks (VLANs), virtual private networks (VPNs), etc. For example, network 120 can provide a virtual circuit with dedicated bandwidth for data communications between clients in remote locations. Network 120 may utilize any point-to-point, point-to-multipoint, or multipoint-to-multipoint networking protocols. Network access protocols used may include, for example, Ethernet, Asynchronous Transfer Mode (ATM), High-Level Data Link Control (HDLC), Frame Relay, Synchronous Optical Networking (SONET)/Synchronous Digital Hierarchy (SDH), Internet Protocol (IP), Transmission Control Protocol (TCP), User Datagram Protocol (UDP), Multiprotocol Label Switching (MPLS), etc.

Example routers 122*a-f* are configured to route data between endpoints. Routers 122*a-f* may be configured to provide connectivity services, such as, for example, virtual Ethernet connections, MPLS tunneling, VLAN routing, service level agreements (SLAs), etc. The term "router" as applied herein includes both network layer routers and data link layer switches. The connectivity service may provide a connection from at least two geographically disparate computers at a particular level of service, such as a particular level of bandwidth, latency, or jitter.

To provide the level of service, routers 122*a-f* may reserve bandwidth for the connection. Reserving may involve associating a particular bandwidth with a user. While still reserving bandwidth, a network may be oversubscribed, meaning that if all users were using all their associated bandwidth, the network would have insufficient capacity. A dedicated network connection can be seen as a private connection to one user. Such a dedicated network connection may be point-to-point, in which the connection connects two points on the network. The dedicated network connection may be public or private. On the other hand, the connection may also be multipoint-to-multipoint, in which a set of one or more points on the network is connected to a second set of one or more network points. A switching device may receive traffic for a particular network connection on a particular port.

FIG. 1A illustrates a network connectivity service connecting endpoint 110 and 112. The connectivity service may route data along a path including router 122*a*, which is connected to endpoint 110 and router 122*b*, and router 122*b*, which is connected to router 122*a* and endpoint 112. In this way, data addressed from endpoint 110 to endpoint 112 may first be sent to router 122*a*. Router 122*a* may forward the data to router 122*b*. And router 122*b* may forward the data to endpoint 112. In one embodiment, this path may be set up by controller 126, which has global knowledge of the topology of network 120. In another embodiment, this path may be established by each of routers 122*a-e* exchanging routing information with its neighbors to communicate their connectivity.

Example data centers 124*a-b* may provide nenvork functions for application to network traffic or services. Data centers may be configured to provide network functions such as, for example, intrusion detection, firewall, packet inspection, data compression, WAN acceleration, TCP proxies, network management functions, etc. The network functions may be provided by the network service provider or by a third party.

Figure 1B:
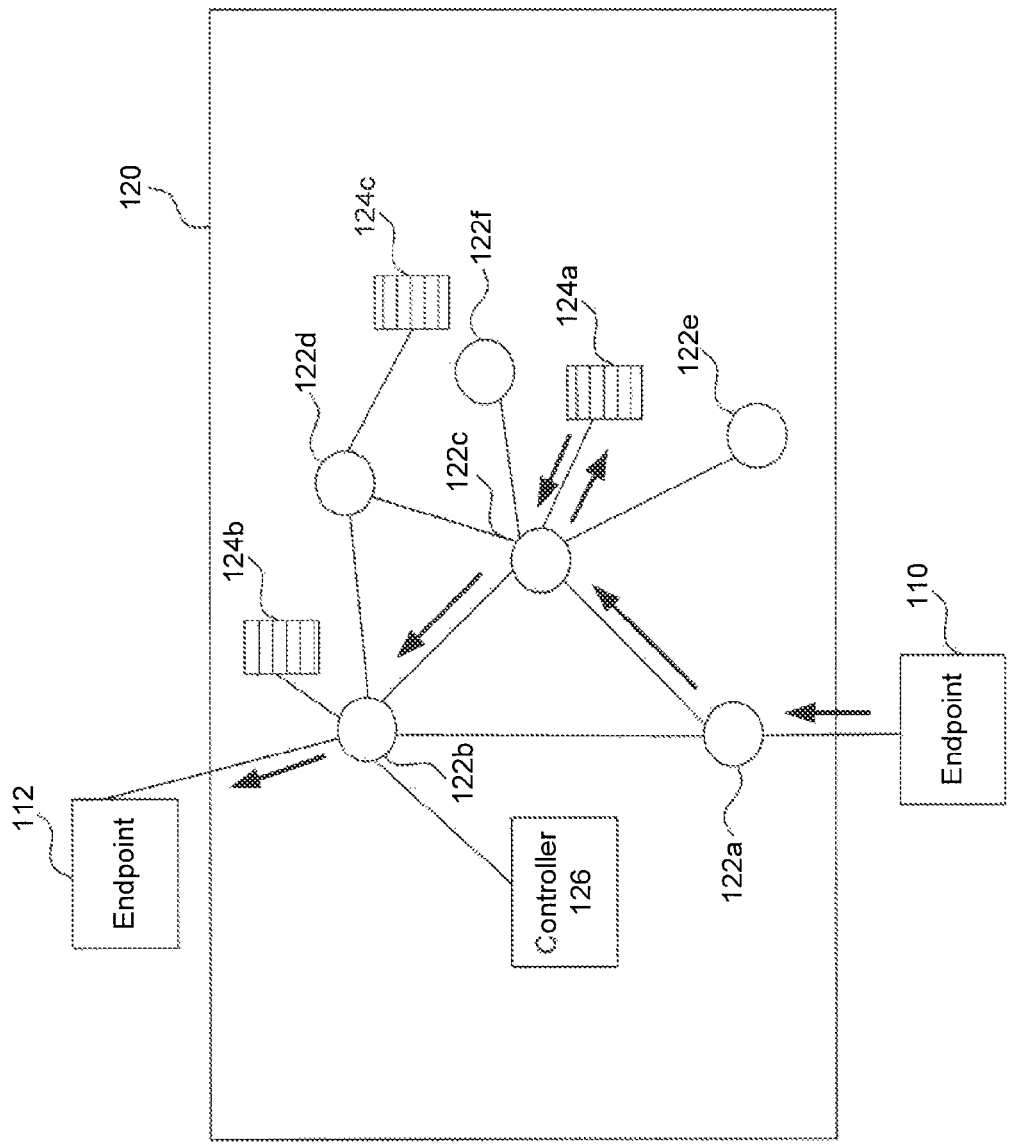

In embodiments, data is dynamically re-routed from to a data center for application of a network function, as illustrated in FIG. 1B. In one embodiment, a user can specify that a network function be applied at some time period in the future. More particularly, the user can specify that the network function be applied to some or all of the data on the network connectivity service at a time period in the future. When the time period begins, network 120 is configured to route data on the network connectivity service to a data center to that applies the network function. When the time period ends, network 120 is configured to route data on the network connectivity service to the destination without reaching a data center that applies the network function.

In another embodiment, the user can specify that a network function be applied when particular usage conditions are met. More particularly, the user can specify that the network function be applied to some or all of the data on the network connectivity service when the data meets certain conditions. The conditions may be based on aggregated data for the network connectivity service. For example, the condition may specify that data is routed to the data center for execution of the network function based on the bandwidth utilized, latency, packet loss, or network routes on the network connectivity services, or utilization level of the network function. In other examples, the condition may specify that a particular flow is routed to the data center for execution of the network function when the packets meet certain conditions (e.g., particular source/destination addresses or ports or payload data matching a particular pattern). When the condition is met, network 120 is configured to route data on the network connectivity service to a data center that applies the network function. When the condition is no longer met, network 120 is configured to route data on the network connectivity service to the destination without reaching a data center that applies the network function.

In the example illustrated in FIG. 1B, an Ethernet connection network service may be configured between endpoints 110 and 112. The service may be enhanced by applying a firewall function to traffic moving from endpoint 110 to endpoint 112. To apply the firewall function, traffic from endpoint 110 can be directed to endpoint 112 may be routed from router 122*a* to router 122*c*. Router 122*c* can then transmit the traffic to data center 124*a*, which can inspect the traffic and apply the firewall function. The traffic can then be transmitted to router 122*b* and then endpoint 112.

Controller 126 may configure and manage routers 122*a-f* and data centers 124*a-b* to create, maintain, and remove network services and network functions. Controller 126 may be implemented in one or more devices connected to the network.

Controller 126 may configure routing tables at routers 122*a-f* to create network services. For example, to create a virtual Ethernet connection between endpoints 110 and 112, controller 126 may create a network path by adding entries to the routing tables of routers 122*a* and 122*b*. Controller 126 may also later add a network function, such as a firewall, to the virtual Ethernet connection between endpoints 110 and 112. To add the firewall, controller 126 may configure the routing tables of routers 122*a*, 122*b* and 122*c* to add an MPLS label to the service's traffic that forwards the traffic through data center 124*a*. Controller 126 may also communicate with data center 124*a* to verify the data center's resource availability to process the firewall, and to configure data center 124*a* to perform the firewall function. The functionality of controller 126 is described in greater detail with respect to FIG. 2 below.

Figure 2:
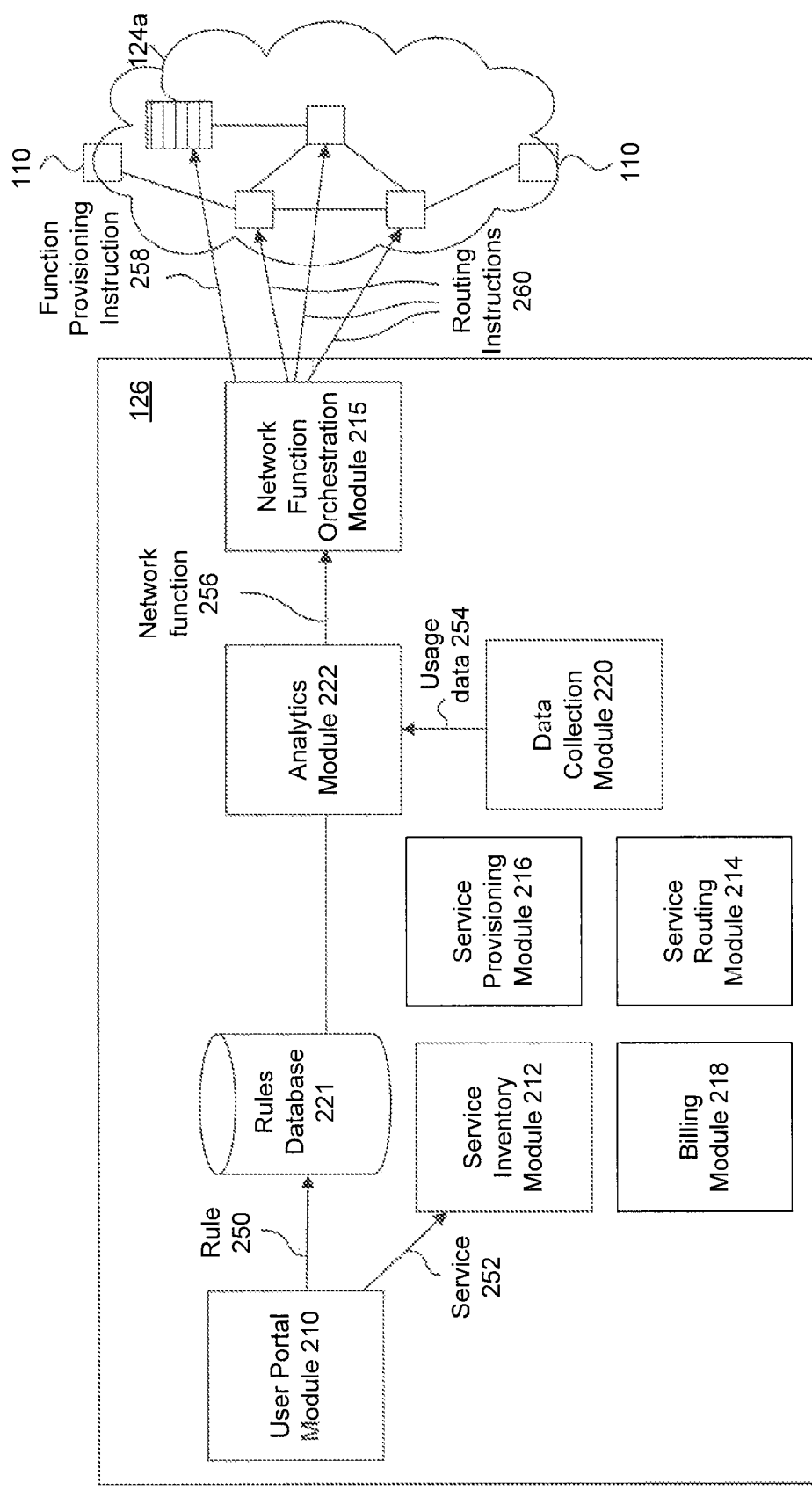
FIG. 2 shows a diagram illustrating functional modules of a controller for dynamically provisioning network functions, according to an example embodiment.

FIG. 2 is a block diagram illustrating functional modules of a controller 126, according to an example embodiment. For simplicity of description, the modules are described as forming part of a single controller entity, however, the various components may form part of one or more separate devices in any combination. Moreover, while certain modules are described as performing various functions, the module boundaries have been arbitrarily defined for simplicity of description.

Controller 126 includes user portal module 210, service inventory module 212, service routing module 214, service provisioning module 216, billing module 218, data collection module 220, rules database 221, and analytics module 222.

User portal module 210 may provide an user interface for a client of network 120 to configure network services and functions. A user may interact with user portal module 210 to request a new network service or modify existing network services. For example, a user may establish a new virtual Ethernet connection between endpoints 110 and 112 with a 10 Mb/s bandwidth. User portal module 210 may communicate to the client the availability and cost information for the requested services.

Using user portal module 210, a user may also establish conditions and rules for initiating network functions. For example, a user may specify that all TCP traffic be analyzed by an intrusion detection system if certain conditions are true. Conditions may involve multiple factors and analytics related to any network, connection or service characteristics. For example, a user may specify that whenever TCP traffic on the virtual Ethernet connection increases by two standard deviations from its average TCP traffic, the network activate a firewall and initiate a TCP packet dump for the next 30 minutes. In another embodiment, the conditions may specify a time period in the future to apply the network function. The time period may also repeat at regular intervals (e.g., weekly, monthly, etc.). Once created, user portal 210 creates a rule—illustrated in FIG. 2 as rule 250 . . . and rules database 221.

Service inventory module 212 maintains an inventory of the services that network 120 is provisioning. The inventory may contain entries for each service, including the type of service, parties of the service, the service's parameters, SLAs, etc. For example, an entry may specify a virtual Ethernet connection between endpoints 110 and 112. The entry may further specify that the connection must provide a 10 Mb/s bandwidth and a maximum latency of 10 ms, and that all traffic must be inspected by an intrusion detection function.

Service routing module 214 determines network routes for services in service inventory module 210. Service routing module 214 analyzes the services and their associated requirements, SLAs or conditions. Service routing module 214 may perform an analysis based on knowledge of the network's topology and the totality of services to be provisioned and their requirements to determine an appropriate route for each service. For example, for a service that requires a higher bandwidth, service routing module 214 may select one high bandwidth route, and for a service that requires a lower latency, service routing module 214 may select a shorter route. In this manner, service routing module 214 implements SLAs associated with each service.

Service provisioning module 216 configures each network device (e.g., routers, switches, etc.) to implement routes determined by service routing module 214 and network function orchestration module 215. Service provisioning module 216 may configure each router's routing tables, MPLS tunneling configurations, etc., to cause the forwarding of services according to the determined routes. The implemented routes may include adding headers to packets in the service to trigger the application of a network function. Users may create services in service inventory module 212 through user portal module 210, as explained above and illustrated in FIG. 2 as service 252. Network administrators may also create services through administrator interfaces, or by setting rules, conditions, and analytics that initiate network services and functions, as explained below with reference to the data collection and analytics modules.

Rules database 221 maintains rules associated with criteria, conditions, or configurations that are evaluated to initiate or terminate network functions. The rules may be provided by or derived from user-provided configurations associated with network services. Network administrators may also provide rules based on desired network management or performance goals. Network function orchestration module 215 may evaluate rules in rules database 221 to trigger one or more network functions to be applied when certain conditions occur, and determine time periods or conditions to terminate their application.

Data collection module 220 monitors network links, elements, and services to gather usage data 254, including network performance statistics and other flow information. In an embodiment, data collection module 220 aggregates statistics collected by each network element. Data collection module 220 may also configure periodic or event-driven reporting at network elements. For example, when a router receives data of a particular type specified in a rule, the router may inform data collection module 220.

Analytics module 222 performs analysis of usage data 254 collected by data collection module 220. Analytics may be used to comply with SLAs by guaranteeing that network resources are available for present and future demand. Analytics module 222 may compare usage data 252 with conditions from rules database 221. When one of the conditions is satisfied, analytics module 222 determines what network function is specified for that rule in rules database. Then, analytics module 222 may signal the network function—illustrated as network function 254 in FIG. 2—to network function orchestration module 215.

Network function orchestration module 215 determines and manages the provisioning of network functions to be applied to network services. Network function orchestration module 215 may store information about network topology, link capacity, router capacity, data center capacity, etc., to provision resources and routes for network functions. Network function orchestration module 215 may receive information or commands indicating that a network function is to be applied to a network service. Based on this information, network function orchestration module determines which data center to use for the network function.

In one example, analytics module 222 may send a signal to network function orchestration module 215 indicating that a link's utilization is nearing capacity, and based on this network function orchestration module 215 may determine that a compression function should be applied to a service that is traveling through the link. In another example, a user or network administrator triggers the initiation of a network function, and service inventory module 212 sends a signal to network function orchestration module 215 to provision the network function.

To provision a network function, network function orchestration module 215 may determine an available data center 124, inside or outside network 120, that can process the function. Once an available data center 124 is found, network function orchestration module 215 may reserve resources at the data center and determine how to appropriately route the service to the data center. Network function orchestration module 215 may, for example, instantiate a process, thread, or virtual machine at the data center 124, or a reserve pooled resource. Network function orchestration module 215 may then determine a route that meets the SLAs for the process and for other processes that may share the route's links.

To provision the function data, network function orchestration module 215 may send function provisioning instruction 258 to the data center to provide the function. Function provisioning instruction 258 may specify the network service the function is to be applied to, the times the function should be started and ended, and any parameters of the function. To provision the new route, network function orchestration module 215 may send routing instructions 260 to respective routers on the route to from the source to the data center, and, possibly, from the data center to the destination. Routing instructions 260 may specify routing tables entries, MPLS routing entries, etc.

Billing module 218 communicates with service inventory module 212 and network function orchestration module 215 to determine how much to bill a client for network services and network functions. In an embodiment, a user may be billed for the amount of time that a network function is applied to a network service.

For example, assume network 120 is providing a virtual Ethernet service between endpoints 110 and 112, and routing the service through routers 122a and 122b. In the example, analytics module 222 may initially detect that the latency between endpoints 110 and 112 is 5 ms, and that the SLA for the service requires a maximum latency of 10 ms. At a later time, analytics module 120 may detect that the latency has increased to 7 ms. Analytics module 222 may, independently or in response to the latency increase, inspect the route between endpoints 110 and 112 and discover that the utilization for the link between routers 122a and 122b is at 80%. Analytics module 222 may determine, based on rules or specified conditions in rules database module 221, that 80% exceeds a threshold utilization for this link, and can send a signal to network function orchestration module 215 to take remedial action. Network function orchestration module 215 may determine that a compression function can be applied to the virtual Ethernet service traffic flowing endpoint 110 to endpoint 112 to decrease link utilization. Network function orchestration module may use network topology and data center location information to determine a route and appropriate data centers that can apply the function. For example, network function orchestration module 215 may provision a compression function at data center 124a and a decompression function at data center 124b by initiating a virtual machine at each of these data centers. Network function orchestration module 215 can then communicate to service provisioning module 216 the new route for the service traffic that comprises: receiving the service packets from endpoint 110 at router 110, forwarding them to router 122c, then to data center 124a for compression, sending the compressed service packets back to router 122c, then to router 122a, then to router 122b, then to data center 124b for decompression, back to router 122b and finally to endpoint 112. Service provisioning module 216 would configure each of routers 122a, 122b, and 122c to implement the route.

Figure 3:
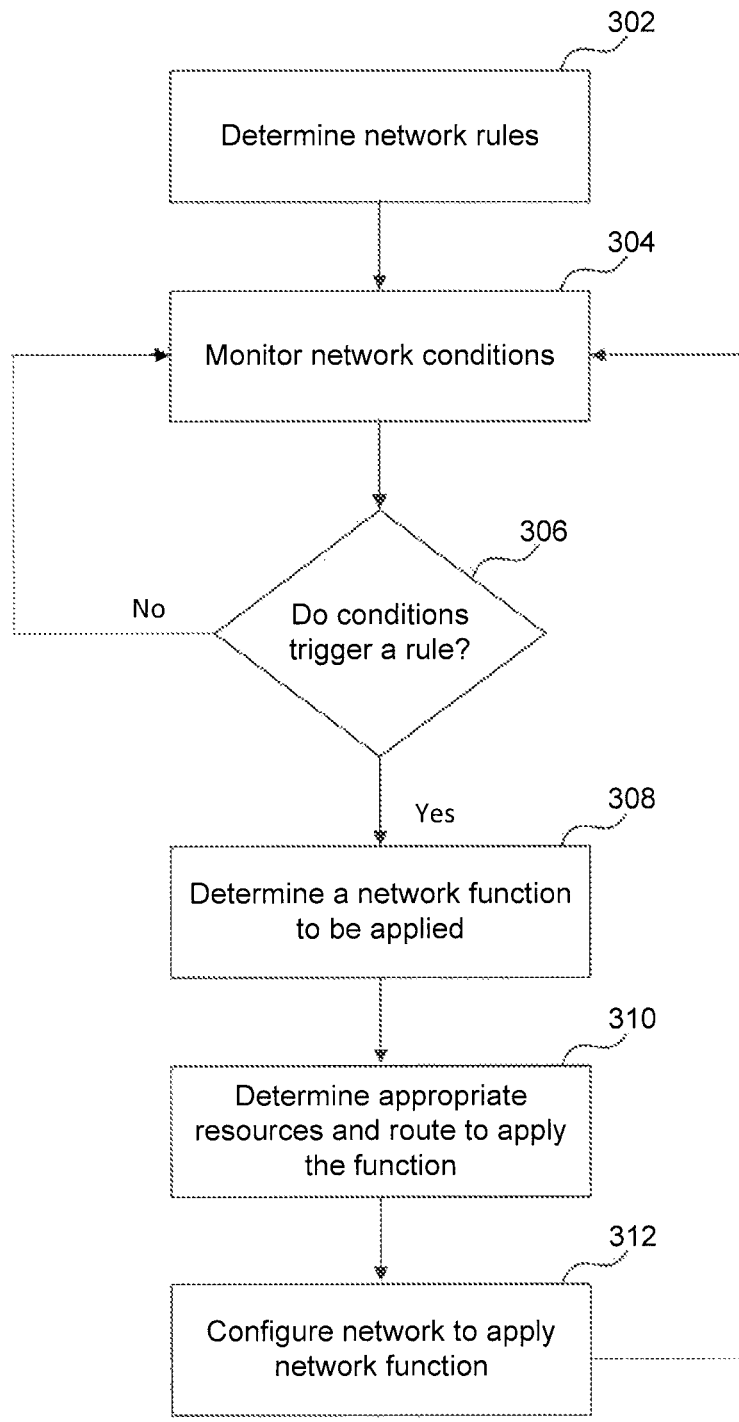
FIG. 3 is a flowchart illustrating a method of dynamically provisioning network functions, according to example embodiment.

FIG. 3 is a flowchart that depicts a method 300 of dynamically provisioning network functions, according to example embodiment.

At step 302, the network receives or determines rules and other configuration information for monitoring network conditions and applying network services or functions. Network users or administrators may input the rules and configuration information. For example, the network may provide network users with a portal user interface to subscribe, manage and configure network services and functions. Users may configure rules, conditions, or schedules for applying network functions to network services. For example, a network user may use a portal to subscribe to a virtual Ethernet service that provides connectivity between two endpoint LANs, and enter any SLA requirements for the service. The user may then configure options in the portal related to the virtual Ethernet service, for example, configuring a rule specifying that if traffic through the virtual Ethernet connection increases by more than two standard deviations from the average, the network should set up a firewall through the connection and initiate a packet dump for the duration of the traffic spike. The user may set up these rules at the time the virtual Ethernet service is set up, or after the Ethernet service is running. The user may also change this configuration, and add different rules or functions to the service at a later time.

Rules and configuration information may also be associated with network links, network elements, or other network characteristics in general. For example, a configuration may specify actions to be taken if a network link become overutilized by traffic from multiple services.

At step 304, the network monitors conditions associated with the rules and configurations. For example, if a rule associated with a service specifies that a packet dump should be performed when traffic exceeds two standard deviations from an average, the network may keep track of the service's average traffic and its standard deviation.

At step 306, the network determines whether any monitored network conditions trigger a rule or event associated with the network or a service. If a network conditions meets a criterion established by any configuration or rule, the network proceeds to step 308 to determine a network function to be applied.

At step 308, the network determines a network function to apply. The network function may be specified by a rule or configuration, or be selected based on available network resources. For example, if the network has detected a traffic anomaly, the network may choose to perform a packet dump and initiate a medium security firewall. The network may then analyze traffic and select a different network function to apply, such as a higher security intrusion detection function.

At step 310, once the network has selected a network function, the network determines appropriate resources and routes for providing the network function. For example, the network may determine a data center with sufficient available resources to process the function and within a route that satisfies any SLA requirement of the service or services to which the function is to be applied. The network may use topology and routing information available at a central location, and may query data centers to determine resource availability.

At step 312, the network configures network elements, for example, routers, switches, data centers, etc., to provide the network function. The network may configure, for example, MPLS tunnels to route service traffic through a data center. Routers may be configured to add an MPLS label to packets of the service, and data centers may be configured to apply the functions to packets containing the appropriate MPLS label.

In an embodiment, the network may change or remove the application of a network function by continuing to monitor network conditions and evaluating appropriate rules. For example, if a rule specified that a service's traffic should be firewalled during a traffic spike, the network may monitor the traffic to determine when the spike has ended, and then remove the firewall function at that time. In an embodiment, a user may specify an amount of time the function is to be applied as part of a rule. In this manner, the network reacts and adapts to events and provides functions dynamically when appropriate, thus saving resources while providing enhanced functionalities.

Figure 4:
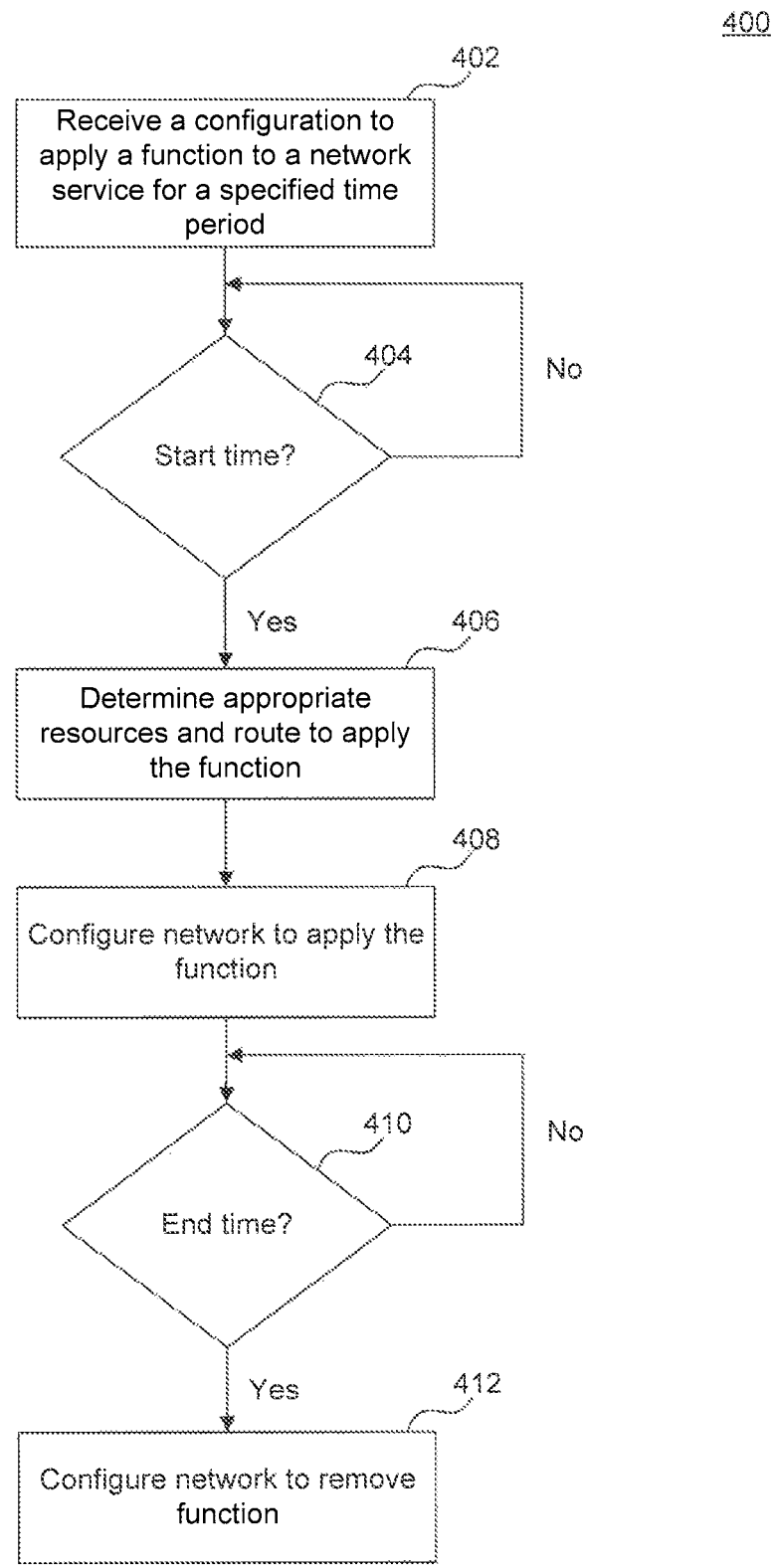
FIG. 4 is a flowchart illustrating a method of dynamically provisioning network functions for a specified time period, according to example embodiment.

FIG. 4 is a flowchart that depicts a method 400 of dynamically provisioning network functions for a specified time period, according to example embodiment.

At step 402, the network receives rules and other configuration information for monitoring network conditions and applying network services or functions for a specified time period. Network users or administrators may input the rules and configuration information that schedule the application of network functions or indicate an amount of time the functions should be applied. For example, a network user may use a portal to subscribe to a virtual Ethernet service that provides connectivity between two endpoint LANs, and enter any SLA requirements for the service. The user may observe that TCP traffic through the virtual Ethernet service increases dramatically every day from 2 PM to 4 PM. The user may then configure a rule specifying that the network should perform a packet dump and activate an intrusion detection function every day from 2 PM to 4 PM.

As shown at steps 404 and 406, at or before the start time for the scheduled function the network determines the start time the network determines appropriate resources and routes for providing the network function. For example, the network may determine a data center with sufficient available resources to process the function and within a route that satisfies any SLA requirement of the service or services to which the function is to be applied. The network may use topology and routing information available at a central location, and may query data centers to determine resource availability.

At step 408, the network configures network elements, for example, routers, switches, data centers, etc., to provide the network function. The network may configure, for example, MPLS tunnels to route service traffic through a data center. Routers may be configured to add an MPLS label to packets of the service, and data centers may be configured to apply the functions to packets containing the appropriate MPLS label.

Once the specified time period expires, the network removes application network function by, again, configuring network elements and data centers, as shown in steps 410 and 412.

CONCLUSION

Rules database module 221 may be any stored type of structured memory, including a persistent memory. In examples, a database may be implemented as a relational database or file system.

Each of the blocks and modules in FIGS. 1 and 2 may be implemented in hardware, software, firmware, or any combination thereof.

Each of the blocks and modules in FIGS. 1 and 2 may be implemented on the same or different computing devices. Such computing devices can include, but are not limited to, a personal computer, a mobile device such as a mobile phone, workstation, embedded system, game console, television, set-top box, or any other computing device. Further, a computing device can include, but is not limited to, a device having a processor and memory, including a nontransitory memory, for executing and storing instructions. The memory may tangibly embody the data and program instructions. Software may include one or more applications and an operating system. Hardware can include, but is not limited to, a processor, memory, and graphical user interface display. The computing device may also have multiple processors and multiple shared or separate memory components. For example, the computing device may be a part of or the entirety of a clustered computing environment or server farm.

Identifiers, such as "(a)," "(b)," "(i)," "(ii)," etc., are sometimes used for different elements or steps. These identifiers are used for clarity and do not necessarily designate an order for the elements or steps.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present embodiments should not be limited by any of the above-described examples, but should be defined only in accordance with the following claims and their equivalents.

What is claimed is:

1. A computer-implemented method of dynamically provisioning a network function in a network, the method comprising:

monitoring a network traffic flow, including at least one packet routed through the network, to determine whether the network traffic flow meets a first criterion of a first rule, the first rule specifying that, when the first criterion is met, a network function be used to analyze or process the network traffic flow; and when the network traffic flow is determined to meet the first criterion:
determining a first route through the network to a network function provider that provides the network function;
determining one or more routers along the first route; and
configuring the one or more routers along the first route to forward the network traffic flow to the network function provider for analysis or processing;

while the network function is applied, monitoring the network traffic flow to determine the network traffic flow meets a second criterion of a second rule; and in response to the determination the network traffic flow meets the second criterion:
determining a second route through the network such that the second route directs traffic to a destination of the network traffic flow without reaching the network function provider;
determining one or more routers along the second route; and
configuring the one or more routers along the second route to forward the network traffic flow.

2. The method of claim 1, wherein the determining the network traffic flow meets the first criterion comprises determining that a characteristic of a network link associated with the network traffic flow exceeds a threshold.

3. The method of claim 1, wherein the determining the first route comprises determining the first route satisfies a service level agreement of a network service associated with the network traffic flow.

4. The method of claim 1, wherein the determining the first route comprises:
   determining whether the network function provider has available resources to analyze or process the network traffic flow; and
   determining the first route to be through the network function provider dependent on whether the network function provider has adequate resources.

5. The method of claim 1, wherein the determining the network traffic flow meets a first criterion comprises determining that a characteristic of the network service exceeds a service level agreement threshold associated with a network service.

6. The method of claim 1, further comprising:
   billing a network client associated with the traffic flow based on an amount of time the network function is used.

7. The method of claim 1, wherein the first criterion is specified by a client of a network service.

8. A system for dynamically provisioning a network function in a network, comprising:
   a computing device;
   an analytics module, implemented on the computing device, configured to:
      monitor a network traffic flow, including at least one packet routed through the network, to determine whether the network traffic flow meets a first criterion of a first rule, the first rule specifying that, when the first criterion is met, a network function be used to analyze or process the network traffic flow;
   a network function orchestration module, implemented on the computing device, configured to:
      when the network traffic flow is determined to meet the first criterion:
         determine a first route through the network to the network function provider that provides the network function; and
         determine one or more routers along the first route; and
   a service provisioning module, implemented on the computing device, configured to:
      configure the one or more routers along the first route to forward the network traffic flow to the network function provider for analysis or processing;
   while the network function is applied, monitoring the network traffic flow to determine the network traffic flow meets a second criterion of a second rule; and
   in response to the determination the network traffic flow meets the second criterion:
      determining a second route through the network such that the second route directs traffic to a destination of the network traffic flow without reaching the network function provider;
      determining one or more routers along the second route; and
      configuring the one or more routers along the route to forward the network traffic flow.

9. The system of claim 8, wherein the determining the network traffic flow meets the first criterion comprises determining that a characteristic of a network link associated with the network traffic flow exceeds a threshold.

10. The system of claim 8, wherein the determining the first route comprises:
    determining whether the network function provider has available resources to analyze or process the network traffic flow; and
    determining the first route to be through the network function provider dependent on whether the network function provider has adequate resources.

11. The system of claim 8, wherein the determining the network traffic flow meets a first criterion comprises determining that a characteristic of the network service exceeds a service level agreement threshold associated with a network service.

12. The system of claim 8, further comprising:
    billing a network client associated with the traffic flow based on an amount of time the network function is used.

13. The system of claim 8, wherein the first criterion is specified by a client of a network service.

14. A non-transitory computer-readable medium having instructions stored thereon that, when executed by at least one computing device, causes the at least one computing device to perform operations for dynamically provisioning a network function in a network, the operations comprising:
    monitoring a network traffic flow, including at least one packet routed through the network, to determine whether the network traffic flow meets a first criterion of a first rule, the first rule specifying that, when the first criterion is met, a network function be used to analyze or process the network traffic flow; and
    when the network traffic flow is determined to meet the first criterion:
       determining a first route through the network to a network function provider that provides the network function;
       determining one or more routers along the first route; and
       configuring the one or more routers along the first route to forward the network traffic flow to the network function provider for analysis or processing;
    while the network function is applied, monitoring the network traffic flow to determine the network traffic flow meets a second criterion of a second rule; and
    in response to the determination the network traffic flow meets the second criterion;
       determining a second route through the network such that the second route directs traffic to a destination of the network traffic flow without reaching the network function provider;
       determining one or more routers along the second route; and
       configuring the one or more routers along the second route to forward the network traffic flow.

15. The computer-readable medium of claim 14, wherein the determining the first route comprises determining the first route satisfies a service level agreement of a network service associated with the network traffic flow.

16. The computer-readable medium of claim 14, wherein the determining the network traffic flow meets a first criterion comprises determining that a characteristic of the network service exceeds a service level agreement threshold associated with a network service.

17. The computer-readable medium of claim 14, wherein the determining the first route comprises determining whether the network function provider has available resources to analyze or process the network traffic flow.

18. The computer-readable medium of claim 14, further comprising:

billing a network client associated with the traffic flow based on an amount of time the network function is used.

19. The computer-readable medium of claim 14, wherein the first criterion is specified by a client of a network service.

20. A computer-implemented method of dynamically provisioning a network function in a network, the method comprising:
- receiving a rule indicating that a network function to analyze or process a network traffic flow is to be applied at an initiation time; and
- determining a first route through the network to a network function provider that provides the network function;
- determining one or more routers along the first route; and
- configuring the one or more routers along the first route to forward the network traffic flow to the network function provider for analysis or processing.

21. The method of claim 20, wherein the rule indicates a termination time, further comprising:
- determining a second route through the network;
- determining one or more routers along the second route; and
- configuring the one or more routers along the second route to forward, at the termination time, the network traffic flow.

* * * * *